United States Patent
Edwards et al.

(10) Patent No.: US 10,812,400 B2
(45) Date of Patent: Oct. 20, 2020

(54) ADAPTABLE CIRCUIT BREAKER CHAIN FOR MICROSERVICES

(71) Applicant: International Business Machines Corporation, Armonk, NY (US)

(72) Inventors: Andrew Edwards, Southampton (GB); Martin Ross, Gosport (GB)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 15/870,974

(22) Filed: Jan. 14, 2018

(65) Prior Publication Data
US 2019/0222526 A1    Jul. 18, 2019

(51) Int. Cl.
| | |
|---|---|
| *H04L 12/841* | (2013.01) |
| *G06F 5/06* | (2006.01) |
| *H04L 29/08* | (2006.01) |
| *H04L 29/06* | (2006.01) |

(52) U.S. Cl.
CPC ............ *H04L 47/283* (2013.01); *G06F 5/06* (2013.01); *H04L 67/02* (2013.01); *H04L 69/10* (2013.01); *H04L 69/28* (2013.01)

(58) Field of Classification Search
CPC .................................. H04L 47/283; G06F 5/06
See application file for complete search history.

(56) References Cited

U.S. PATENT DOCUMENTS

| | | | |
|---|---|---|---|
| 2010/0299437 A1* | 11/2010 | Moore | ................ H04L 67/1008 709/226 |
| 2016/0316028 A1* | 10/2016 | Sengupta | ................ H04L 43/16 |
| 2017/0046146 A1 | 2/2017 | Jamjoom et al. | |
| 2017/0242784 A1 | 8/2017 | Heorhiadi et al. | |

FOREIGN PATENT DOCUMENTS

WO    WO2017127225    7/2017

OTHER PUBLICATIONS

Marks, Kevin, "Circuit breakers and microservices (or, how to really use Hystrix)," datawire.io, Nov. 4, 2016.
Pattern: Circuit Breaker, http://microservices.io, Aug. 28, 2017.
(Continued)

*Primary Examiner* — Kodzovi Acolatse
*Assistant Examiner* — Farhad Ali
(74) *Attorney, Agent, or Firm* — Jay Wahlquist

(57) ABSTRACT

A method for configuring an adaptable circuit breaker chain in a microservices architecture includes transmitting a request from an upstream service to a target one of the services and receiving in a circuit breaker of the upstream service a response from a circuit breaker of the target indicating an inability to provide a response to the transmitted request and including meta-data describing an attempt by the circuit breaker of the target to receive a response from the downstream service to an underlying request of the target necessary to provide a response to the request transmitted by the upstream service. Finally, on condition that the meta-data indicates a delay by the circuit breaker of the target incurred in receiving a response to the underlying request, the method includes changing a pattern of delay imposed by the circuit breaker of the upstream service from a default pattern of delay.

18 Claims, 2 Drawing Sheets

(56) References Cited

OTHER PUBLICATIONS

De la Torre, et al., "Implementing the Circuit Breaker Pattern," docs.microsoft.com, May 26, 2017.
Broadhurst, "IBM Integration Bus High Availability Overview," IBM Software, Ju;. 1, 2014, 11 pages. <https://www.slideshare.net/PeterBroadhurst/active-365363727from_action=save>.
Dvorkin, "Seven micro-services architecture advantages," Art of Software Engineering, Jun. 3, 2014, 3 pages. <http://eugenedvorkin.com/seven-micro-services-architecture-advantages/>.
Fowler, "Circuit Breaker," MartinFowler.com, Mar. 6, 2014, 8 pages. <https://martinfowlercom/blikii CircuitBreaker.html>.

* cited by examiner

ADAPTABLE CIRCUIT BREAKER CHAIN FOR MICROSERVICES

BACKGROUND OF THE INVENTION

Field of the Invention

The present invention relates to the field of microservices and more particularly to circuit breaker utilization in a microservices architecture.

Description of the Related Art

A microservices architecture refers to the development of a software application as a suite of independently deployable, small, modular services in which each service executes as a unique process and communicates through a well-defined, lightweight mechanism to serve a business goal. Each of the modular services may communicate with others of the modular services utilizing any communications protocol desired, though customarily the modular services communicate with each other utilizing a lightweight protocol such as hypertext transfer protocol (HTTP) with representational state transfer (REST) incorporating Javascript Object Notation (JSON).

The microservices architecture is to be contrasted to a monolithic architecture. Unlike microservices, a monolith application has the architecture of a single, autonomous unit. In a client-server model, the server-side application acts as a monolith handling HTTP requests, executing logic, and retrieving and updating data in a underlying data store. As will be recognized, however, in a monolithic architecture, all changes to even the smallest portion of the application require a rebuilding of the entire application. As well, the need to scale a portion of a monolithic application results in the need to scale the entire monolithic application. In contrast, in a microservices architecture, a change to a service remains isolated to that service without the need to rebuild the entire suite of services. Further, the need to scale one service in a microservices architected application does not require a scaling of all services in the microservices architected application.

A microservices architecture also may be contrasted to a services oriented architecture (SOA). In SOA, a composition of components are combined in a highly coordinated way requiring the use of a high level application programming interface (API) adapted to coordinate an entire action over one or more components of the application. In contrast, in a microservices architecture, the low-level details of each service is exposed by a corresponding simple interface unique to each service, and coordination between the services occurs through the use of unsophisticated communication pipes over which calls to the respective APIs of the services are issued and results returned. With a high-level API, as is characteristic of SOA, it becomes difficult to rewire small components together, since the service designer has removed many of the seams or choices that can be taken by providing a single high-level interface.

In a microservices architecture, since each service is independent of the other, when a method call is issued over a communicative link to another service, the calling service allows for a period of time during which the calling service anticipates a response from the called service. After one or more attempts over the period of time, a "circuit breaker" component proactively discontinues further attempts and notes the unavailability of the called service. However, one can imagine a circumstance where a called service, in order to fulfill a request of a calling service, itself must become a calling service to yet another called service. To the extent that a called service in a chain of called services incurs a delay, the ability of a circuit breaker in each of the called services to perform proper circuit breaking becomes complex and error prone.

BRIEF SUMMARY OF THE INVENTION

Embodiments of the present invention address deficiencies of the art in respect to the operation of a circuit breaker in a microservice architecture and provide a novel and non-obvious method, system and computer program product for an adaptable circuit breaker chain in a microservices architecture. In an embodiment of the invention, a method for configuring an adaptable circuit breaker chain in a microservices architecture includes establishing a lightweight communications link between an upstream service amongst a collection of services in a microservices architected application, and a target one of the services in the microservices architected application, and also between the target one of the services and a downstream service amongst the collection of services in the microservices architected application. The method also includes transmitting a request from the upstream service to the target one of the services and receiving in a circuit breaker of the upstream service a response from a circuit breaker of the target one of the services indicating an inability to provide a response to the transmitted request and including meta-data describing an attempt by the circuit breaker of the target one of the services to receive a response from the downstream one of the services to an underlying request of the target one of the services necessary to provide a response to the request transmitted by the upstream service. Finally, on condition that the meta-data indicates a delay by the circuit breaker of the target one of the services incurred in receiving a response to the underlying request, the method includes changing a pattern of delay imposed by the circuit breaker of the upstream service from a default pattern of delay.

In one aspect of the embodiment, the changed pattern of delay is an increase in time of a delay imposed by the circuit breaker of the upstream service before re-transmitting the request to the target one of the services. In another aspect of the embodiment, the changed pattern of delay is a change in a number of attempts by the circuit breaker of the upstream service to re-transmit the request to the target one of the services. In yet another aspect of the embodiment, the changed pattern of delay is a marking of the target one of the services as unavailable for an amount of time indicated by the meta-data of an unavailability of the downstream one of the services. Of note, the lightweight communications link between the upstream service and the target one of the services is HTTP/REST and the meta-data is included in an HTTP header of the response from the target one of the services to the upstream service. However, as an alternative, the meta-data is stored in a central repository accessible by each of the services of the microservices architected application.

In another embodiment of the invention, a microservices architected data processing system is configured for an adaptable circuit breaker chain in a microservices architecture. The system includes a host computing system that has one or more computers, each with memory and at least one processor. The system also includes a multiplicity of services arranged to form a microservices architected application executing in the memory of the host computing system, each of the services communicating with others of the services utilizing at least one lightweight communications link. Finally, each of the services includes a circuit breaker. The circuit breaker includes program code which during execution by the processor, is enabled to transmit a request from a corresponding one of the services as an upstream service to a target one of the services, to receive a response from a circuit breaker of the target one of the services indicating an inability to provide a response to the transmitted request and including meta-data describing an attempt by the circuit breaker of the target one of the services to receive a response from a downstream one of the services to an underlying request of the target one of the services necessary to provide a response to the request transmitted by the upstream service, and on condition that the meta-data indicates a delay by the circuit breaker of the target one of the services incurred in receiving a response to the underlying request, to change a pattern of delay imposed by the circuit breaker of the upstream service from a default pattern of delay.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for an adaptable circuit breaker chain in a microservices architecture. In accordance with an embodiment of the invention, different services in a microservices architecture are adapted to include respectively different circuit breakers. Each of the different circuit breakers in a corresponding one of the services includes computer program code configured to report to a circuit breaker of an upstream calling service an inability to provide a response to the upstream calling service to a request from the upstream calling service due to an inability for a downstream service to respond to a request of the corresponding one of the services necessary to respond to the request from the upstream calling service. As well, the program code is enabled to provide meta-data with the report representative of a number of retries attempted by the corresponding one of the services. Consequently, the program code of the circuit breaker of the upstream calling service is enabled to modify a process for managing retries of the request from the upstream calling service to account for the meta-data.

Figure 1:
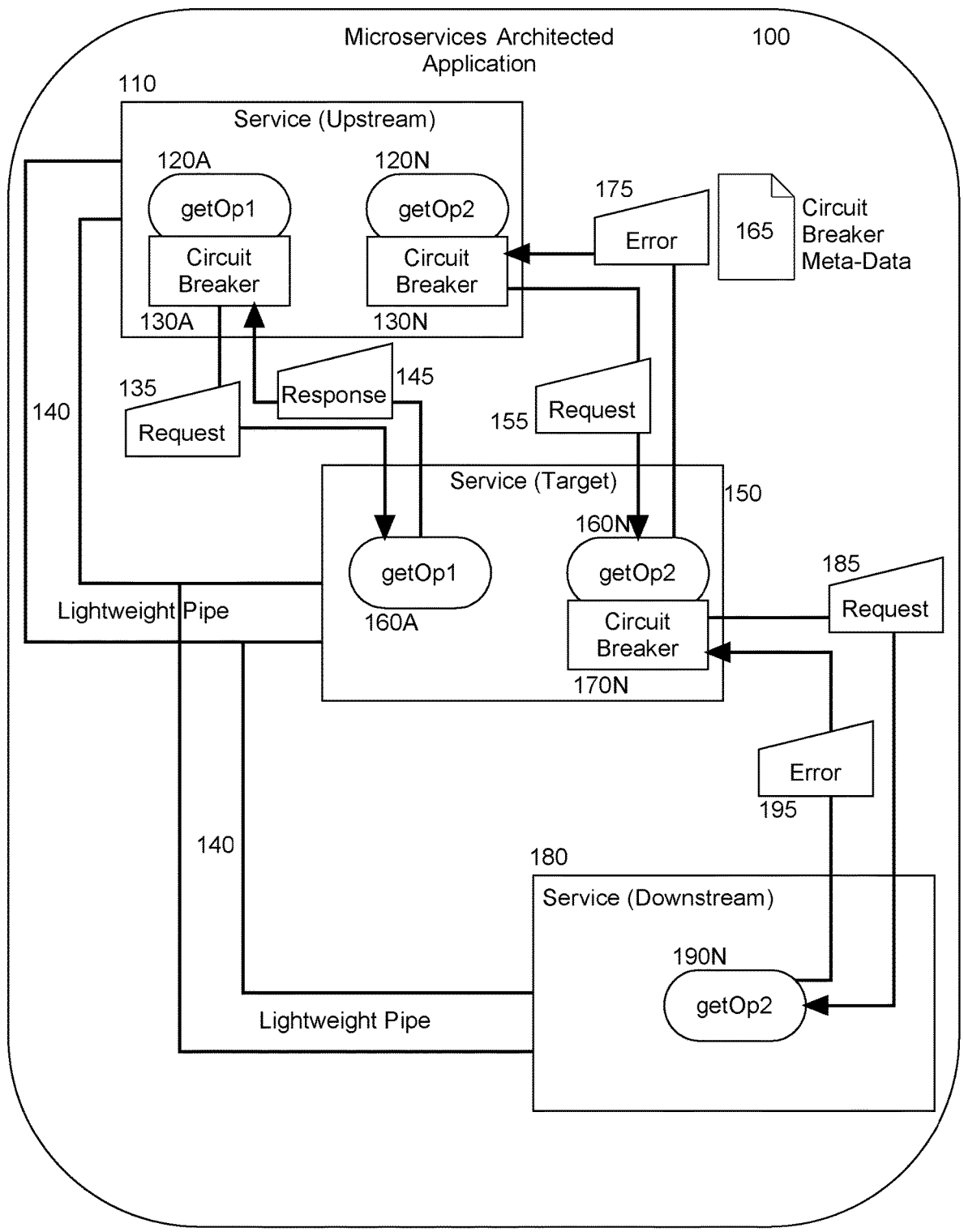
FIG. 1 is pictorial illustration of a process for configuring an adaptable circuit breaker chain in a microservices architecture.

In further illustration, FIG. 1 pictorially shows a process for configuring an adaptable circuit breaker chain in a microservices architecture. As shown in FIG. 1, a microservices architected application 100 includes different services 110, 150, 180 communicatively linked to one another over a lightweight communication links 140. An upstream service 110 in particular invokes different operations 120A, 120N which in turn are dependent upon the invocation of corresponding operations 160A, 160N in a target service 150. In both instances, a circuit breaker 130A, 130N manages the request-response interactions between the upstream service 110 and the target service 150 by accounting for non-responsive periods of time following requests 135, 155 and determining one or more remedial actions based upon a pre-determined pattern of actions in consequence of a sensed delay in receiving a response to each of the requests 135, 155.

In this regard, the pre-determined pattern of actions may indicate delaying an attempt to re-issue the request 145, 155 with the delay period either being fixed no matter how many attempts have occurred, or variable depending upon a number of re-issuances previously attempted. The pre-determined pattern of actions may also include determining a failure condition following a pre-determined number of re-issuances. In any event, upon receiving a response 145 to a corresponding request 135, the circuit breaker 130A passes the response into the upstream service 110 for processing. However, a different response 175 to the request 155 in the form of an error condition may be received in circuit breaker 130N. The different response 175 may indicate not only an error condition in connection with the request 155, but also the different response 175 may be accompanied by circuit breaker meta-data 165.

In this regard, as illustrated by example in FIG. 1, the request 155 issued by upstream service 110 to target service 150 may be dependent upon an invocation of a corresponding operation 190N in a downstream service 180 and the intermediary management of a circuit breaker 170N managing the request 185 from the target service 150 to the downstream service 180. More particularly, the circuit breaker 170N may identify an error 195 returned in response to the request 185, which error 195 may in turn result in a delay in response to the request 155 apparent to the upstream service 110. As such, the circuit breaker 170N may provide along with the different response 175 the circuit breaker meta-data 165 indicating a contemporaneous status of the request 185 and a number of attempts to re-issue the request 185 and any delays imposed by the circuit breaker 170N between attempts to re-issue the request 185.

The circuit breaker 130N, in turn, may account for the meta-data 165 in modifying the pre-determined pattern. For instance, the circuit breaker 130N may increase a time of a delay imposed by the circuit breaker 130N before re-transmitting the request 155 to the target service 150. As another example, the circuit breaker 130N may change a number of attempts by the circuit breaker 130N of the upstream service 110 to re-transmit the request 155 to the target service 150. As yet another example, the circuit breaker 130N may mark the target service 150 as unavailable for an amount of time indicated by the meta-data 165 of an unavailability of the downstream service 180. In this way, the circuit breaker 130N of the upstream service 110 accounts for the responsiveness or lack thereof of the downstream service 180 in respect to the target service 150 in performing a circuit breaking action though the upstream service 110 and the downstream service 180 are not directly communicating regarding the request 185 by the target service 150 to the downstream service 180 in support of the request 155 by the upstream service 110 to the target service 150.

Figure 2:
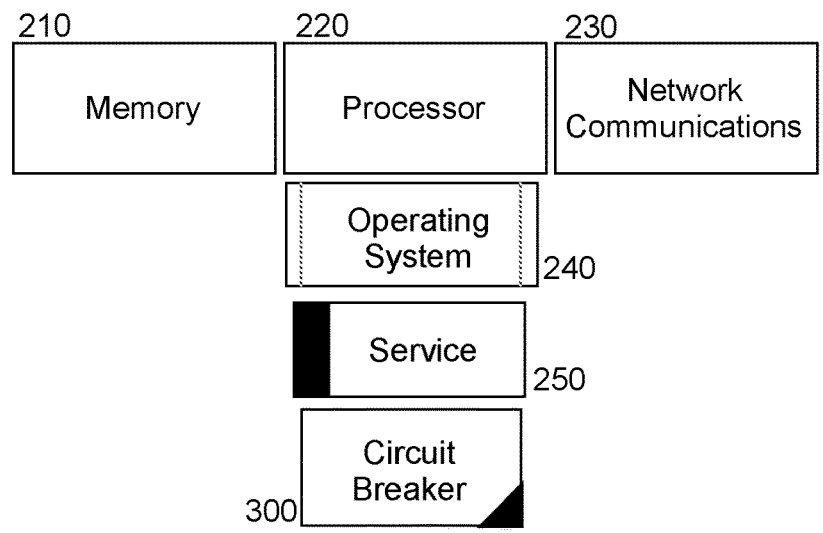
FIG. 2 is a schematic illustration of a data processing system configured for an adaptable circuit breaker chain in a microservices architecture; and, FIG. 3 is a flow chart illustrating a process for configuring an adaptable circuit breaker chain in a microservices architecture.

The process described in connection with FIG. 1 may be implemented in a data processing system. In further illustration, FIG. 2 schematically shows a data processing system configured for an adaptable circuit breaker chain in a microservices architecture. The system includes a host computing system that includes one or more computers, each with memory 210, at least one processor 220 and network communications circuitry 230 permitting network communications between the different computers. An operating system 240 executes in the memory 210 utilizing the processor 220 and supports the operation of one or more services 250 of a microservices architected application. Each of the services 250 (only a single one of the services shown for ease of illustration) includes a circuit breaker 300.

The circuit breaker 300 is a computer program module that includes computer readable and executable instructions by the processor 220. The instructions of the circuit breaker 300 are enabled to monitor a response to a request to a target one of the services 250 by an associated upstream one of the services 250 and to apply a circuit breaking action based upon a pre-determined pattern dependent upon, for example, a number of attempts to receive a response to the request. The instructions of the circuit breaker 300 also are enabled to extract circuit breaker meta-data from an error response received from the target one of the services 250, and to modify the pattern according to the meta-data, such as by changing a duration of any delay in re-issuing a request or a number of attempts to reissue the requests.

Finally, the instructions of the circuit breaker 300 are enabled to respond to a received request from a further upstream one of the services 250 with an error response along with meta-data pertaining to any delay experienced in receiving a response from a downstream one of the services 250 required in order to respond to the received request from the further upstream one of the services 250. The meta-data provided along with the response to the received request may indicate a number of attempts to re-issue the request, or duration of any delays incurred between attempts to re-issue the request to the downstream one of the services 250, to name two such examples.

Figure 3:
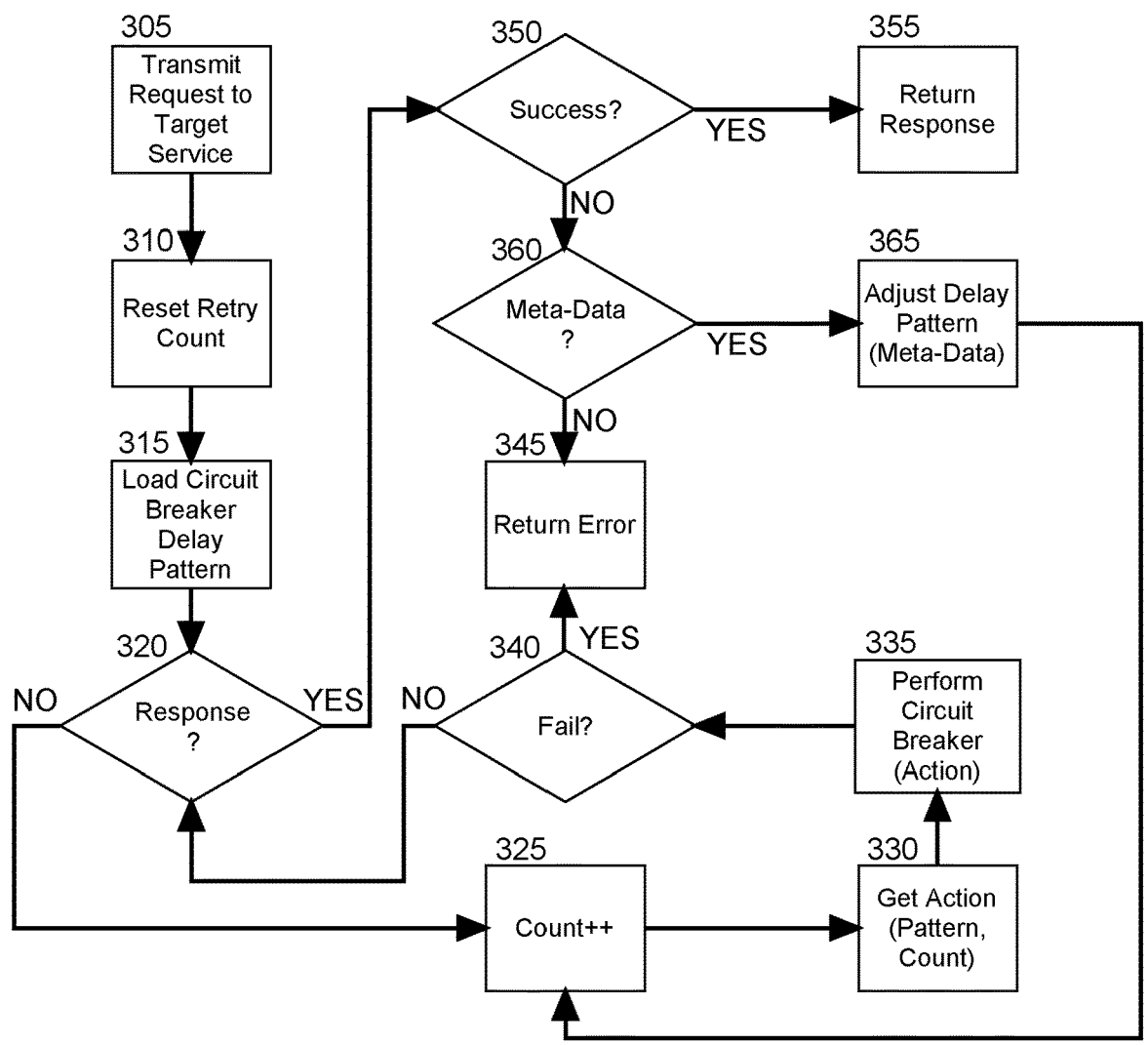

In even yet further illustration of the operation of the circuit breaker 300, FIG. 3 is a flow chart illustrating a process for configuring an adaptable circuit breaker chain in a microservices architecture. Beginning in block 305, the upstream service transmits a request to a target service over a lightweight communication link. In block 310, the circuit breaker resets the retry count to zero and in block 315, the circuit breaker loads a circuit breaker delay pattern based upon which the circuit breaker manages one or more actions based upon a response or lack thereof to the request by the target service. Thereafter, in decision block 320, the circuit breaker determines if a response has been received from the target service in response to the request.

On the condition that the circuit breaker determines no response to have been received from the target service, in block 325, the circuit breaker increments the retry count and retrieves an action to be performed based upon the loaded pattern and the count in block 330. In block 335, the circuit breaker performs the retrieved action and determines in decision block 340 whether or not the action is one concluding a failure of the request. If so, the circuit breaker returns an error condition to the corresponding service in block 345, otherwise, the process repeats in decision block 320.

In this regard, in decision block 320, on the condition that the circuit breaker determines a response has been received in response to the request, in decision block 350, the circuit breaker further determines if the response indicates an error condition or a successful response to the request. In the event that the circuit breaker determines the response to be a successful response, the circuit breaker returns the response to the corresponding service in block 355. Otherwise, in decision block 360 the circuit breaker determines whether or not meta-data has been provided with the response indicative of an error condition. If not, in block 345 the circuit breaker returns to the corresponding service an indication of an error condition.

However, to the extent that the circuit breaker determines that meta-data has been provided with the response, in block 365 the circuit breaker adjusts the loaded pattern to account for the content of the meta-data, for example by changing one or more delay periods to exceed the delays indicated in the meta-data. Thereafter, in block 325 the circuit breaker increments the retry count and in block 330, the circuit breaker retrieves an action to be performed based upon the modified pattern and the count. In block 335, the circuit breaker then performs the retrieved action and determines in decision block 340 whether or not the action is one concluding a failure of the request. If so, the circuit breaker returns an error condition to the corresponding service in block 345, otherwise, the process repeats in decision block 320.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A method for configuring an adaptable circuit breaker chain in a microservices architecture, the method comprising:

establishing a lightweight communications link between an upstream service amongst a collection of services in a microservices architected application, and a target one of the services in the microservices architected application, and also between the target one of the services and a downstream service amongst the collection of services in the microservices architected application;

transmitting a request from the upstream service to the target one of the services;

receiving in a circuit breaker in communication with an operation of the upstream service a response from a circuit breaker in communication with a different operation of the target one of the services indicating an inability of the different operation to provide a response to the transmitted request and including meta-data describing an attempt by the circuit breaker in communication with the different operation of the target one of the services to receive a response from the downstream one of the services to an underlying request of the target one of the services necessary to provide a response to the request transmitted by the upstream service; and, on condition that the meta-data indicates a delay by the circuit breaker in communication with the different operation of the target one of the services incurred in receiving a response to the underlying request, changing a pattern of delay imposed by the circuit breaker in communication with the operation of the upstream service from a default pattern of delay.

2. The method of claim 1, wherein the changed pattern of delay is an increase in time of a delay imposed by the circuit breaker of the upstream service before re-transmitting the request to the target one of the services.

3. The method of claim 1, wherein the changed pattern of delay is a change in a number of attempts by the circuit breaker of the upstream service to re-transmit the request to the target one of the services.

4. The method of claim 1, wherein the changed pattern of delay is a marking of the target one of the services as unavailable for an amount of time indicated by the meta-data of an unavailability of the downstream one of the services.

5. The method of claim 1, wherein the lightweight communications link between the upstream service and the target one of the services is hypertext transfer protocol (HTTP) with representational state transfer (REST) and wherein the meta-data is included in an HTTP header of the response from the target one of the services to the upstream service.

6. The method of claim 1, wherein the meta-data is stored in a central repository accessible by each of the services of the microservices architected application.

7. A microservices architected data processing system configured for an adaptable circuit breaker chain in a microservices architecture, the system comprising:
a host computing system comprising one or more computers, each with memory and at least one processor;
a multiplicity of services arranged to form a microservices architected application executing in the memory of the host computing system, each of the services communicating with others of the services utilizing at least one lightweight communications link;
each of the services including a circuit breaker in communication with an operation of a corresponding one of the services, the circuit breaker comprising program code which during execution by the processor, is enabled to transmit a request from a corresponding one of the services as an upstream service to a target one of the services, to receive a response from a circuit breaker in communication with a different operation of the target one of the services indicating an inability of the different operation to provide a response to the transmitted request and including meta-data describing an attempt by the circuit breaker in communication with the operation of the target one of the services to receive a response from a downstream one of the services to an underlying request of the target one of the services necessary to provide a response to the request transmitted by the upstream service, and on condition that the meta-data indicates a delay by the circuit breaker in communication with the operation of the target one of the services incurred in receiving a response to the underlying request, to change a pattern of delay imposed by the circuit breaker in communication with a different operation of the upstream service from a default pattern of delay.

8. The system of claim 7, wherein the changed pattern of delay is an increase in time of a delay imposed by the circuit breaker of the upstream service before re-transmitting the request to the target one of the services.

9. The system of claim 7, wherein the changed pattern of delay is a change in a number of attempts by the circuit breaker of the upstream service to re-transmit the request to the target one of the services.

10. The system of claim 7, wherein the changed pattern of delay is a marking of the target one of the services as unavailable for an amount of time indicated by the meta-data of an unavailability of the downstream one of the services.

11. The system of claim 7, wherein the lightweight communications link between the upstream service and the target one of the services is hypertext transfer protocol (HTTP) with representational state transfer (REST) and wherein the meta-data is included in an HTTP header of the response from the target one of the services to the upstream service.

12. The system of claim 7, wherein the meta-data is stored in a central repository accessible by each of the services of the microservices architected application.

13. A computer program product for configuring an adaptable circuit breaker chain in a microservices architecture, the computer program product comprising a computer readable storage medium having program instructions embodied therewith, wherein the computer readable storage medium is not a transitory signal per se, the program instructions executable by a device to cause the device to perform a method comprising:
establishing a lightweight communications link between an upstream service amongst a collection of services in a microservices architected application, and a target one of the services in the microservices architected application, and also between the target one of the services and a downstream service amongst the collection of services in the microservices architected application;
transmitting a request from the upstream service to the target one of the services;
receiving in a circuit breaker coupled to an operation of the upstream service a response from a circuit breaker in communication with a different operation of the target one of the services indicating an inability of the different operation to provide a response to the transmitted request and including meta-data describing an attempt by the circuit breaker in communication with the different operation of the target one of the services to receive a response from the downstream one of the services to an underlying request of the target one of the services necessary to provide a response to the request transmitted by the upstream service; and,
on condition that the meta-data indicates a delay by the circuit breaker of the target one of the services incurred in receiving a response to the underlying request, changing a pattern of delay imposed by the circuit breaker of the upstream service from a default pattern of delay.

14. The computer program product of claim 13, wherein the changed pattern of delay is an increase in time of a delay imposed by the circuit breaker of the upstream service before re-transmitting the request to the target one of the services.

15. The computer program product of claim 13, wherein the changed pattern of delay is a change in a number of attempts by the circuit breaker of the upstream service to re-transmit the request to the target one of the services.

16. The computer program product of claim 13, wherein the changed pattern of delay is a marking of the target one of the services as unavailable for an amount of time indicated by the meta-data of an unavailability of the downstream one of the services.

17. The computer program product of claim 13, wherein the lightweight communications link between the upstream service and the target one of the services is hypertext transfer protocol (HTTP) with representational state transfer (REST)

and wherein the meta-data is included in an HTTP header of the response from the target one of the services to the upstream service.

18. The computer program product of claim 13, wherein the meta-data is stored in a central repository accessible by each of the services of the microservices architected application.

\* \* \* \* \*